July 7, 1964
P. RUTTEN ETAL
3,139,862
FEEDER
Filed Oct. 3, 1962
3 Sheets-Sheet 1
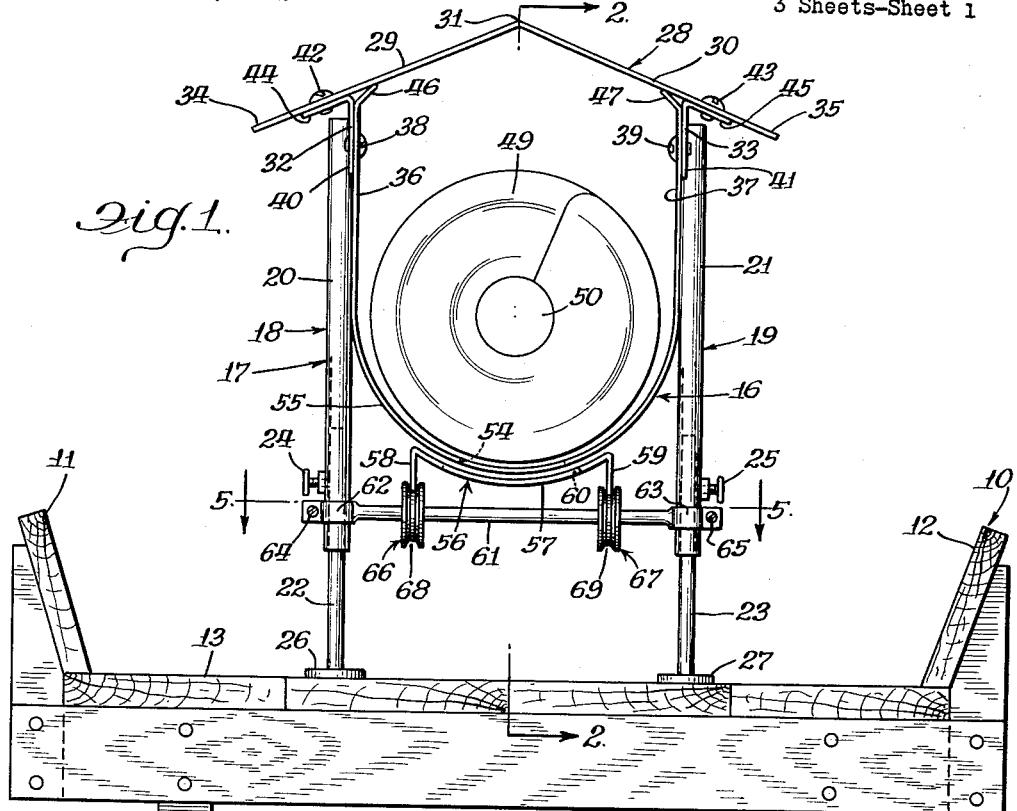
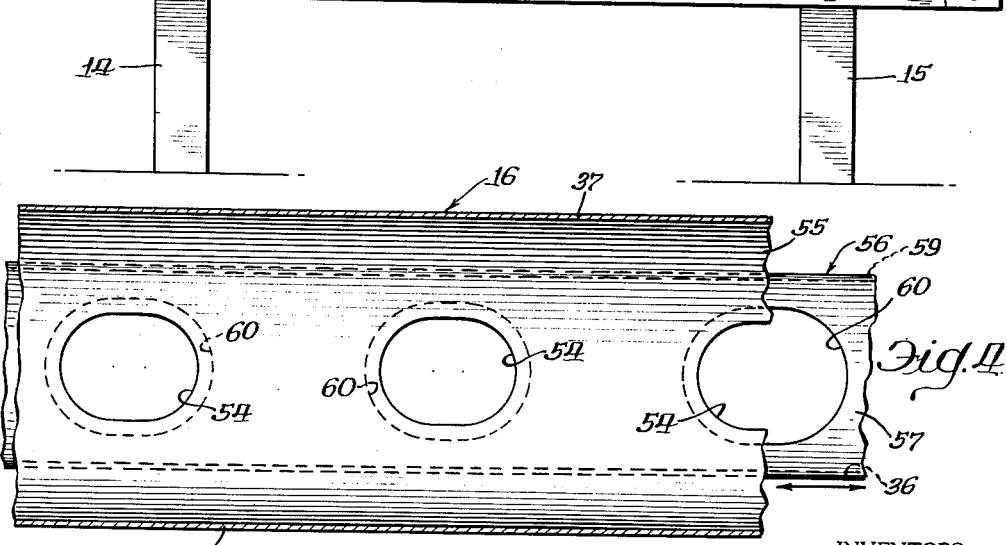
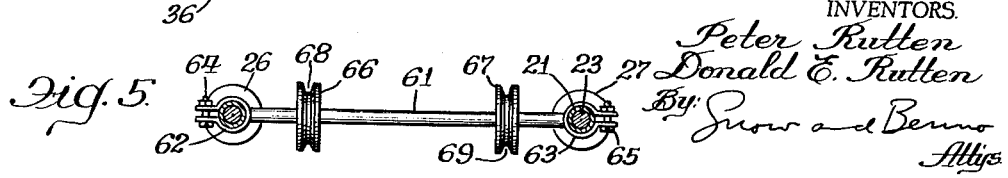
INVENTORS.
Peter Rutten
Donald E. Rutten
By Snow and Benno
Attys.

July 7, 1964

P. RUTTEN ETAL 3,139,862

FEEDER

Filed Oct. 3, 1962

INVENTORS.
Peter Rutten
Donald E. Rutten
BY Snow and Benno
Attys

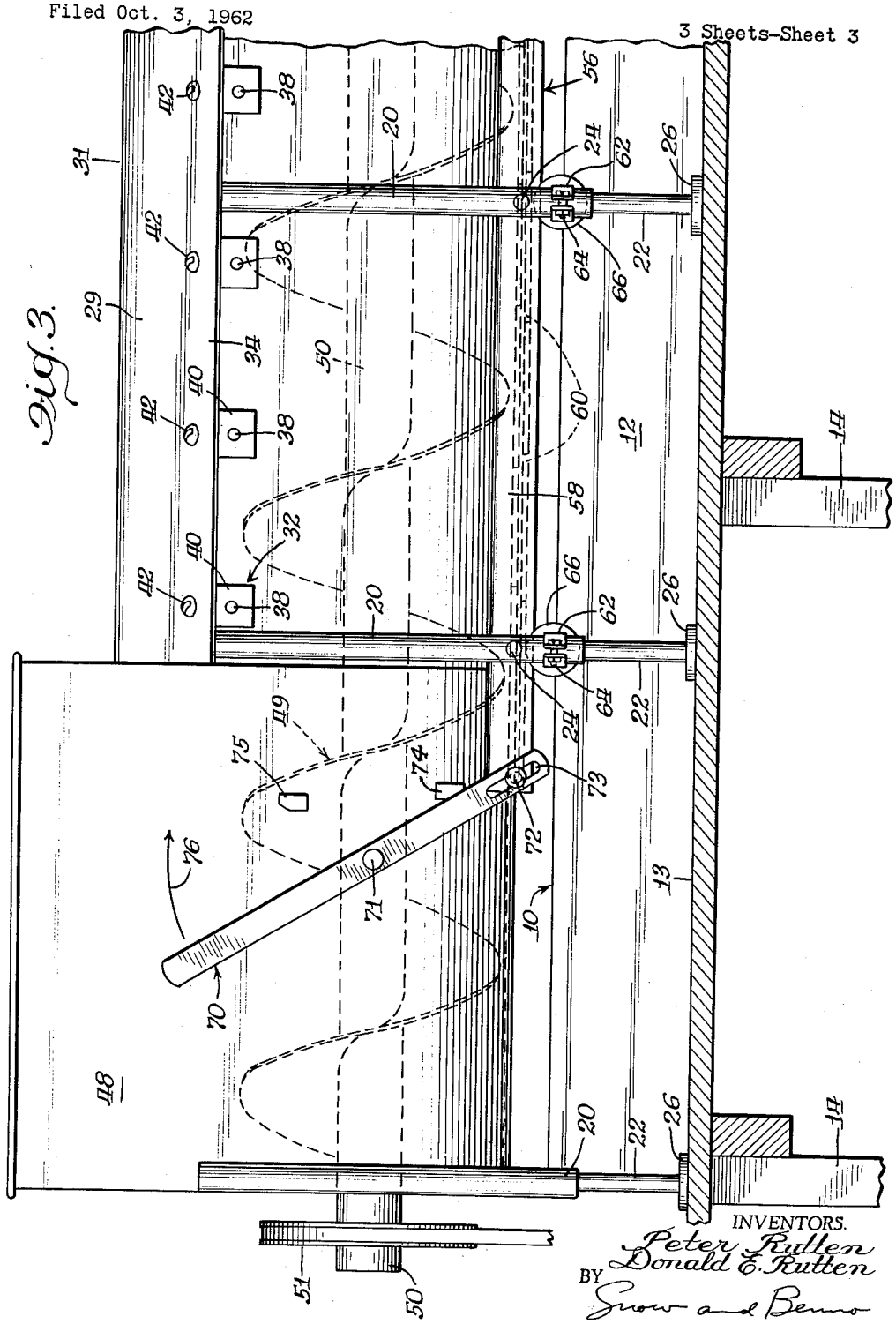

United States Patent Office 3,139,862
Patented July 7, 1964

3,139,862
FEEDER
Peter Rutten and Donald E. Rutten, Plainfield, Ill., assignors to P & D Sales & Mfg. Co., a division of The Neff and Fry Company, a corporation of Ohio
Filed Oct. 3, 1962, Ser. No. 228,117
5 Claims. (Cl. 119—56)

This invention relates to a new and improved feeder.

The chore of feeding farm animals has been going through a period of evolution in much the same manner as is presently occurring throughout all industry. Labor-saving devices and automation are the combined ultimate goal of this evolution. In the field of feeding livestock and poultry and the like the feeds used are becoming more complex as research shows blended diets with vitamin complements bring about greater animal growth in a shorter period of time and concurrently producing a better grade of meat. Thus, with large herds and flocks the raiser has the difficult task of insuring that each animal gets the same selected diet. Bunk feeders are utilized to feed many farm animals in a side-by-side relationship. The bunk feeder is usually in the form of an elongated trough extending in a radiating line from a feed supply receptacle such as a silo.

It is one of the primary objects of the feeder of this invention to distribute feed uniformly throughout the full length of a bunk feeder so that animals feeding at any point along the length of the bunk will receive the same diet.

An important object of this invention is the provision of a movable closure member cooperable with a plurality of spaced apart openings in an elongated container.

Another important object of this invention is to supply a feeder with a closure member slidable on roller members for simultaneously opening or closing a plurality of discharge apertures.

Still another important object of this invention is to equip a generally horizontally disposed elongated feeder having a plurality of spaced apart bottom discharge openings with a cooperable slidable closure member having vertical adjustment.

Another and still further important object of this invention is to provide a feeder for various mixtures such as silage and grain for discharge at spaced intervals along the full length of a bunk feeder without separation of the mixture components.

An important object of this invention is to provide a bunk feeder for cattle or the like in which uniformly mixed quantities of feed are discharged from a container to the bunk feeder uniformly from one end to the other.

Still another important object of this invention is the provision of a feeder in which many animals may be fed simultaneously without the crowding of any animals.

Another and still further important object of this invention is to provide a device for simultaneously mixing predetermined feed mixtures while delivering the feed to an elongated bunk.

A further important object of this invention is to equip a tube type feeder with means for filling the tube throughout its length and then discharging feed from the tube at regular intervals along its length in response to operation of a pressure switch located at the outer end of the tube.

Other and further important objects and advantages will become apparent from the disclosures in the accompanying drawings and following specification.

In the drawings:

FIGURE 1 is a transverse sectional view of the feeder of this invention.

FIGURE 2 is a sectional view taken on the line 2—2 of FIGURE 1 and showing the outer end of the feeder.

FIGURE 3 is a side elevational view of the hopper or feed end of the feeder of this invention.

FIGURE 4 is a sectional view taken on the line 4—4 of FIGURE 2.

FIGURE 5 is a sectional view taken on the line 5—5 of FIGURE 1 and constitutes a detail elevational view of a roller carrying support of this feeder.

As shown in the drawings:

The reference numeral 10 indicates generally an elongated open top bunk feeder having spaced apart side walls 11 and 12 and a bottom 13 spanning the space between the walls 11 and 12. The bunk feeder 10 is provided with spaced apart ground engaging legs 14 and 15. Raisers of livestock and poultry and the like utilize bunk type feeders to feed a plurality of animals simultaneously. The bunk is usually very long to serve many animals. Premixed feeds are preferably deposited in the bunk over the full width and length thereof so that animals may approach the bunk from both sides thereof to gain access to the feed. Oftentimes divider boards are placed in the center of the bunk so that different rations of feed may be delivered to opposite sides of the elongated bunk for feeding by animals from pens on both sides.

The present invention is concerned with the dispensing of specially mixed feeds to the bunk uniformly over its full length. A U-shaped elongated tubular feed container 16 is disposed above the center of the bunk 10. The container 16 is carried on a supporting structure 17. The supporting structure includes spaced apart height-adjustable legs or post members 18 and 19. These leg members include upper tubular portions 20 and 21 and lower telescoping portions 22 and 23 respectively. Set screws 24 and 25 act to set the telescopic extent of the upper and lower portions of the legs 18 and 19. For example, the leg 18 consisting of the members 20 and 22 may have its length adjustable by loosening the set screw 24 and either pulling the lower member 22 outwardly or telescoping it further to effect variation in height as desired and then retightening the set screw 24. The bottoms of the legs 18 and 19 are provided with foot pads 26 and 27 respectively and it is on these pads that the support rests on the bottom 13 of the elongated bunk.

A cover 28 is provided for the open top U-shaped trough or container 16. The cover 28 includes inclined sides 29 and 30 joining in an apex or peak line 31 along the length of the container. The cover 28 is fastened to the U-shaped trough 16 by means of spaced apart angle brackets 32 and 33. These brackets are disposed under the eaves 34 and 35 of the cover 28. The angle brackets 32 and 33 are utilized in a manner in which they abut the spaced apart sides 36 and 37 of the U-shaped container 16. Screws 38 and 39 pass outwardly through the sides 36 and 37 and engage downwardly projecting lugs 40 and 41 of the angle brackets 32 and 33. Similarly screws 42 and 43 pass through the inclined sides 29 and 30 of the cover and engage the angularly and outwardly extending legs 44 and 45 of the angle brackets 32 and 33. The top edges of the sides 36 and 37 of the U-shaped container 16 are bent slightly inwardly toward each other as shown at 46 and 47 forming ledges upon which the cover 28 may rest. Further, the bent top flanges add to the rigidity of the U-shaped container making it resistant to distortion in use.

As best shown in FIGURE 3 a feed receiving hopper 48 is provided at one end of the U-shaped container 16. An auger conveyor 49 commencing within the hopper 48 runs through the U-shaped container 16 to the outer end thereof. The auger conveyor 49 is provided with a shaft 50 journaled at one end within the end of the hopper 48. The shaft 50 is equipped with a V-pulley 51 on its end outside the hopper 48. It is through this pulley that drive is imparted to the auger conveyor 49.

As best shown in FIGURE 2 a gate 52 is provided at the end of the container 16 opposite the hopper 48. The end gate 52 is preferably hinged at 53 to permit outward swinging. This permits feed transported by the auger conveyor 49 to move outwardly through the end of the container 16. In an automatically operating feed unit a switch mechanism may be employed in association with the end gate so that swinging movement of the end gate 52 causes a discharge of feed from the container. The container is provided with openable apertures in the bottom thereof to be subsequently described. The end gate 52 thus acts as a control means and insures that the container 16 is full of feed throughout its length prior to the opening of the discharge apertures. The utilization of an end gate either as a means to directly effect opening and closing of a closure mechanism or to signal the filling of the container with feed throughout its length is not a specific part of the present invention and thus the details thereof have not been shown.

The bottom of the container 16 is provided with regularly spaced apart openings 54. The openings are disposed in general longitudinal alignment along the downwardly curved or concave bottom 55 of the container. An elongated closure member 56 is provided to cooperate with the curved bottom of the container to accomplish either an opening or a closing of the spaced apertures 54. In cross section, the closure member has a downwardly curved or concave central portion 57 and spaced apart downwardly projecting side flanges 58 and 59. The central curved portion of the closure member 56 is provided with regularly spaced apart openings 60 disposed in a longitudinal path along the concave central portion. The openings 60 in the closure member are slightly larger than the openings 54 in the U-shaped container 16, but have their centers located on the same line. The larger openings 60 facilitate easy registering with the openings 54 in the container and prevent any blocking of the openings 54 in the U-shaped container by the closure member when it is desired to permit discharge of feed therefrom.

A transverse shaft 61 having outwardly projecting end clamps 62 and 63 is arranged and constructed to have the clamps adjustably engage the supporting legs 18 and 19 respectively. Removable fastener members 64 and 65 are provided in the outer ends of the clamps 62 and 63 so that a user of the device may easily adjust the shaft 61 in any desired vertical position relative to the supporting structure. Rollers 66 and 67 are journally mounted in spaced apart positions on the shaft 61 and together with a plurality of such rollers provide the means for supporting the closure member in operating relationship with the U-shaped container. The rollers 66 and 67 are provided with annular grooves 68, 69 for engagement by the downwardly projecting side flanges 58 and 59 of the closure member. The closure member thus rolls on the plurality of rollers 66 and 67 located on each of the supporting standards located at intervals along the length of the bunk feeder.

An operating lever 70 is provided on the hopper 48. The lever is hingedly mounted on a pin 71 for swinging movement thereabout. A pin 72 on the end of the closure member 56 is adapted to engage an elongated slot 73 in one end of the lever 70. Swinging movement of the lever 70 causes the closure member 56 to roll longitudinally on the plurality of spaced apart rollers 66 and 67. A limit stop 74 is mounted on the side of the hopper 48 and is engaged by the lever 70 in one position thereof. This position of the lever corresponds to an endwise position of the closure member 56 in which position the larger openings 60 of the closure member are in registration with the somewhat smaller openings 54 in the bottom 55 of the U-shaped container 16. When the closure member has its openings in registration with the container openings, the far end of the closure member 56 is substantially coincident with the outer end of the U-shaped container. Conversely when the lever 70 is swung about its hinge mounting 71 for engagement with a second spaced apart limit stop 75 located on the side of the hopper the closure member has been drawn inwardly so that the inner end lies beneath the hopper 48 and the solid portions thereof act to close the openings 54 in the bottom of the U-shaped container 16.

The container is filled with feed by operation of the auger conveyor as it moves material from the hopper throughout the length of the container 16. Now when the container is filled and the end gate 52 is swung outwardly by reason of the feed reaching that position, then the lever 70 is swung about its hinge so that it again is in engagement with the limit stop 74 whereupon the openings in the closure member are in registration with the openings in the U-shaped container causing the feed within the container to be dropped into the elongated receptacle or bunk 10 as the auger conveyor is rotated. The bunk is provided with quantities of feed at regularly spaced intervals throughout its full length at positions corresponding to the location of the apertures in the bottom of the container 16. The fact that the container is filled throughout its length preliminary to dumping makes the uniform filling of the bunk possible. An arrow 76 indicates the direction of the arcuate movement of the lever 70.

An extra supporting standard and roller are positioned closely adjacent the outer end of the bunk feeder. Thus when the closure member 56 is moved so that its inner end is disposed under the hopper 48 the outer end will still be roller-carried. The closure member is fully supported even though the very outer end thereof has left the surface of the outermost roller. This auxiliary leg standard is shown at 19a and the roller is identified as roller 67a.

In the operation of the device of this invention the feed bunk 10 is generally arranged in a farmyard in a line radiating outwardly from a silo or feed storage bin. Feed, either in the form of silage, grain, or a combination of silage and grain is delivered from the storage tanks to the feeder of this invention. The hopper 48 is preferably positioned closely adjacent the stored feed so that feed may be deposited in the hopper directly from the silo or other storage receptacles. The auger conveyor 49 is rotated, causing the feed dropped into the hopper to be carried along the U-shaped container 16 until such time as the feed fills the container to the outer end thereof. When the container is full the feed strikes the end gate which acts to effect, either directly or indirectly, an endwise moving of the closure member 56. In the present showing this is accomplished by the operating lever 70 located on the hopper 48. The lever is swung to a position to engage the limit stop 74 such as shown in the drawings causing the openings in the closure member to be in registration with the openings in the U-shaped container thus permitting the feed in the container to be dropped down into the receptacle or bunk 10. Continued operation of the auger conveyor insures quick discharge of the mixed feed from the container to the bunk when the holes are in discharging registration. The closure member is in closed position over the openings in the bottom of the U-shaped container 16 when the lever is abutting the limit stop 75. Mixing of the feed is accomplished in either open or closed position of the closure member whether the feed be grain or silage or a combination of grain, silage and vitamins. All animals feeding at the bunk, whether at the inner or outer ends thereof receive the same diet thereby insuring a uniformly fed herd or flock at the same instant. It should be understood that the closure member may be arranged and constructed to operate by pulling or pushing to effect either opening or closing of the feed discharge openings. The arrangement as shown provides for a pulling of the closure member toward the hopper end to cause the discharge apertures to be closed, but the closure member may be positioned so that a pulling of the closure member will effect its opening and a pushing will effect its closing.

The removable cover or top for the U-shaped container permits feeding and filling of the container without admitting rain or snow thereto. However, the removable cover member facilitates access to any clogging portion of the container merely by removing one or more sections thereof.

The adjustment of the grooved roller up and down, or toward and away from the underside of the container 16 facilitates accurate adjustment of the closure member so that the container is sealed at a time when the feed is being delivered from the hopper to fill the container throughout its length and yet may be conveniently rolled or slid into open position on the rollers to permit discharge of the feed from the container. Similarly the leg supporting members may be raised or lowered as desired to gain any discharging effect for the container. It is apparent that the device herein constitutes a bunk feeder capable of uniform delivery of feeds of any formula of large and small particles throughout the length of an elongated bunk. The dietary value of the feed delivered by the feeder of this invention is constant from one end of the feed bunk to the other. This is accomplished by a continued mixing of feed in the full closed tubular container throughout its length as feed is moved from the hopper to the container by a continuously running, internally disposed auger conveyor.

Numerous details of construction may be varied throughout a wide range without departing from the principles disclosed herein and we therefore do not propose limiting the patent granted hereon otherwise than as necessitated by the appended claims.

What is claimed is:

1. A livestock feeding device comprising an elongated receptacle from which livestock may feed, a feed receiving hopper positioned at one end of said elongated receptacle, an elongated container joined to said hopper and extending along and over said elongated receptacle, supporting standards carrying said elongated container at intervals therealong, an auger conveyor mounted in said elongated container and having a portion thereof extending into said feed receiving hopper, means rotatably driving said auger conveyor to deliver feed from said hopper into and through said elongated container, said elongated container having a curved bottom with regularly spaced apart openings therein, said spaced apart openings in said elongated container being substantially of the same size, an elongated closure plate being formed to have the cross sectional shape of a curved central portion and downwardly projecting side flanges, the curvature of said curved central portion being formed substantially identical to the curvature of said curved bottom of said elongated container, said curved central portion being formed to have a plurality of regularly spaced apart openings therein, guiding means mounted on said standards journally supporting the lower edges of side flanges of said elongated closure plate with said curved central portion thereof covering and slidably engaging said curved bottom of said elongated container, and means slidably positioning said closure plate longitudinally relative to said elongated container so that in one position thereof the openings in the closure plate are in registration with the openings in said elongated container to permit discharge of feed from the elongated container into said elongated receptacle and in another position thereof the openings in said elongated container are closed preventing discharge of feed therefrom.

2. A livestock feeding device comprising an elongated receptacle from which livestock may feed, a feed receiving hopper positioned at one end of said elongated receptacle, an elongated container joined to said hopper and extending along and over said elongated receptacle, supporting structure carrying said elongated container at intervals therealong, an auger conveyor mounted in said elongated container and having a portion thereof extending into said feed receiving hopper, means rotatably driving said auger conveyor to deliver feed from said hopper into and through said elongated container, said elongated container having a curved bottom with regularly spaced apart openings therein, said spaced apart openings through said elongated container being formed substantially of the same size, an elongated closure plate being formed to have the cross sectional shape of a curved central portion and downwardly projecting side flanges, the curvature of said curved central portion being formed substantially identical to the curvature of said curved bottom of said elongated container, said curved central portion being formed to have a plurality of regularly spaced apart openings therein, guiding means mounted on said structure journally supporting the side flanges of said elongated closure plate with said curved central portion thereof covering and slidably engaging said curved bottom of said elongated container for sliding movement with respect thereto.

3. A device as set forth in claim 2 in which said means supporting the side flanges includes spaced apart grooved rollers journally mounted on said supporting structure to receive the lower edges of said side flanges.

4. A device as set forth in claim 3 in which said grooved rollers are vertically adjustable.

5. In a livestock feed device for an elongated bunk having a feed delivery means at one end thereof, a trough having a concave bottom wall, means for fixedly carrying said trough in and above said bunk with one end of said trough in feed receiving relationship to said feed delivery means, an elongated closure plate having a concave longitudinal central portion corresponding in curvature to the curvature of the bottom wall of said trough and generally vertically disposed downwardly projecting longitudinal edge portions flanking the central portion, roller means engaging the lower edges of the longitudinal edge portions of said closure plate to support the central portion of said closure plate against the underside of said bottom wall of said trough and longitudinally slidable to permit said closure plate to be longitudinally reciprocated against the underside of said bottom wall of said trough, opening means formed in the mutually contacting portions of said trough and said closure plate and operating responsive to longitudinal movement of said closure plate in one direction to permit feed to be distributed into said bunk from said trough uniformly for substantially the entire length of said trough and operating responsive to longitudinal movement of said closure plate in the opposite direction to retain feed in said trough, said opening means through said trough comprising a plurality of openings of substantially the same size, said opening means through said closure plate comprising a plurality of openings of substantially the same size, and an auger conveyor positioned in said trough and resting on the bottom wall of said trough to be longitudinally and transversely supported thereby.

References Cited in the file of this patent
UNITED STATES PATENTS

| | | |
|---|---|---|
| 2,646,023 | Virgil | July 21, 1953 |
| 2,742,138 | Potter et al. | Apr. 17, 1956 |
| 2,795,313 | Hazen | June 11, 1957 |
| 2,961,126 | Craig | Nov. 22, 1960 |
| 3,013,529 | Parker et al. | Dec. 19, 1961 |
| 3,077,975 | Hobbs | Feb. 19, 1963 |